United States Patent
Guilley et al.

(10) Patent No.: US 10,236,262 B2
(45) Date of Patent: Mar. 19, 2019

(54) SYSTEM AND METHOD FOR PROTECTING AN INTEGRATED CIRCUIT (IC) DEVICE

(71) Applicant: SECURE-IC SAS, Cesson-Sévigné (FR)

(72) Inventors: Sylvain Guilley, Paris (FR); Thibault Porteboeuf, Paris (FR); Jean-Luc Danger, Antony (FR)

( * ) Notice: Subject to any disclaimer, the term of this patent is extended or adjusted under 35 U.S.C. 154(b) by 0 days.

(21) Appl. No.: 15/391,924

(22) Filed: Dec. 28, 2016

(65) Prior Publication Data
US 2017/0186706 A1 Jun. 29, 2017

(30) Foreign Application Priority Data
Dec. 29, 2015 (EP) .................................... 15307161

(51) Int. Cl.
| | |
|---|---|
| H01L 21/00 | (2006.01) |
| H01L 23/48 | (2006.01) |
| H01L 23/00 | (2006.01) |
| H01L 23/522 | (2006.01) |
| H01L 31/0216 | (2014.01) |
| H01L 27/32 | (2006.01) |
| G09C 1/00 | (2006.01) |

(52) U.S. Cl.
CPC ............. *H01L 23/576* (2013.01); *G09C 1/00* (2013.01); *H01L 23/5225* (2013.01); *H01L 23/573* (2013.01); *H01L 27/3272* (2013.01); *H01L 31/02164* (2013.01); *H04L 2209/12* (2013.01)

(58) Field of Classification Search
CPC ........................ H01L 23/5225; H01L 27/3272
USPC ....................... 257/173, 178, 418; 438/50–53
See application file for complete search history.

(56) References Cited

U.S. PATENT DOCUMENTS

| | | | | |
|---|---|---|---|---|
| 7,498,663 | B2* | 3/2009 | Henmi | H01L 23/5225 257/659 |
| 8,847,431 | B2* | 9/2014 | Shido | H01L 23/5225 307/91 |
| 8,907,460 | B2* | 12/2014 | Hashimoto | H01L 23/585 257/531 |
| 9,640,560 | B2* | 5/2017 | Li | H01L 21/77 |
| 2006/0180939 | A1 | 8/2006 | Matsuno | |
| 2009/0001821 | A1 | 1/2009 | Walker | |
| 2014/0070829 | A1 | 3/2014 | Fornara | |
| 2015/0214163 | A1 | 7/2015 | Kuenemund | |

FOREIGN PATENT DOCUMENTS

DE  10337256 A1  6/2004

OTHER PUBLICATIONS

European Search Report for 15307161.8 dated Jun. 22, 2016.
Helfmeier et al, "Breaking and Entering through the Silicon", CCS'13, Nov. 4-8, 2013.

* cited by examiner

*Primary Examiner* — Calvin Lee
(74) *Attorney, Agent, or Firm* — Meagher Emanuel Laks Goldberg & Liao, LLP

(57) ABSTRACT

Embodiments of the invention provide a system for protecting an integrated circuit (IC) device from attacks, the IC device (100) comprising a substrate (102) having a front surface (20) and a back surface (21), the IC device further comprising a front side part (101) arranged on the front surface of the substrate (102) and stacked layers, at least one of said layers comprising a data layer comprising wire carrying data, the front side part having a front surface (13). The system comprises an internal shield (12) arranged in a layer located below said data layer and a verification circuit configured to check the integrity of at least one portion of the internal shield.

12 Claims, 16 Drawing Sheets

SYSTEM AND METHOD FOR PROTECTING AN INTEGRATED CIRCUIT (IC) DEVICE

BACKGROUND

The invention generally relates to integrated circuit packages, and more particularly to a method and device for protecting an integrated circuit against attacks.

Integrated circuits (ICs) used in a number of embedded devices such as smartcards can contain a secret security key and carry out secret data. The IC needs to be secure against attacks from the outside.

Integrated circuits can be vulnerable to attacks on the physical structure of the integrated circuit device (such as a chip, semiconductor device, etc.).

Microelectronic technologies used to manufacture integrated circuits rely on a layer-based manufacturing process. During such process, material is deposited and etched to form stacked geometries which correspond to transistors, wires and layer-to-layer interconnections (also known as vias). Because this layered process relies on a silicon substrate to create the transistors, the first layers are always used to etch and deposit material related to transistor creation.

There exist different types of attacks against integrated circuits relying on physical modification of the integrated circuits. Such attacks are intended to gain information stored in the integrated circuit and/or to change the operating characteristics of the integrated circuits into other characteristics which can be exploited by the attacker.

ICs may be subject to front-side attacks. Because of the intrinsic structure of the IC manufacturing process, the first layers that are accessible to an attacker performing invasive attacks from the front side are the metal interconnect layers. Such metal interconnect layers form indeed a sensitive resource that an attacker may try to probe, modify or force to a specific value because they are responsible for transmitting valuable information from transistor to transistor.

Front-side attacks may consist of opening of packaged IC devices, and recording electrical signals from the IC device with external probes. To counteract front-side attacks, it is known to use a protection shield to prevent such attacks. The protection shield can be passive or active.

Passive shields can be used to prevent viewing of the circuit and making attacks more time-consuming. Passive shields may be removed without affecting the operation of the device. Passive shields are generally constituted of an upper layer of metal interconnects in a multi-layer circuit. However, a breach in the shield is not detected in passive shields.

Active shields are similar to passive shields. However, a breach in an active shield can disable the integrated circuit. Circumventing an active shield is possible theoretically but this is both complex and time-consuming while being limited to a small number of areas of the integrated circuit under attack.

The protection shield used to protect the IC front-side generally consists of metal structures on the top metal layers to prevent front-side invasive attacks. These structures involve designing a dense mesh that the attacker will need to cut through in order to access the sensitive information. Because of the microscopic nature of the devices, such operation involves additional costs for the attacker.

However, new forms of attacks, referred to as "backside attacks", are emerging whereby the attack is not made through a front surface of the IC but through the silicon substrate via a back surface of the IC. Backside invasive intrusions that attempt to access valuable structures up from the silicon substrate were disclosed recently in "Breaking and entering through the silicon, Clemens Helfmeier and al., CCS 2013". Backside attacks constitute serious threats.

Common shielding techniques are not adapted to prevent these types of attacks.

Backside attacks were elaborated to make circuit modifications to flip-chip devices or on lower metal layers of a multi-layer stacked IC device. These techniques are generally used in combination with invasive attacks such as wafer thinning, laser cutting and heating, focused ion beam (FIB) techniques.

As IC device designs comprise several layers, backside attacks try to reach a lower metal layer, for example, via the back surface rather than passing through many layers of interconnects from the front surface.

The conventional active shield used conventionally is arranged on the front surface of the IC device and is not adapted to prevent attacks conducted through the back surface via the substrate.

There is accordingly a need for improved methods and devices for protecting integrated circuits against backside attacks.

SUMMARY

In order to address these and other problems, there is provided a system for protecting an integrated circuit (IC) device from attacks, the IC device comprising a substrate having a front surface and a back surface, the IC device further comprising a front side part arranged on the front surface of the substrate and comprising stacked layers, at least one of said layers comprising a data layer comprising wire carrying data, the front side part having a front surface, wherein the system comprises an internal shield arranged in a layer located below said data layer and a verification circuit configured to check the integrity of at least one portion of the internal shield.

The internal shield may comprise a mesh of lines, said mesh, being arranged in the empty areas of the layer in which the internal shield is arranged.

The internal shield may be arranged in the layer located on top of the substrate.

The substrate may comprise doped areas and the internal shield may be arranged in at least some of the doped areas.

The substrate may comprise wells in doped regions and the internal shield may be arranged in at least some of said wells.

The front-side part may comprise standard cells, and the internal shield may be arranged in areas between standard cells.

The internal shield may be implemented in standard cells.

In certain embodiments, the verification circuit may be connected to the output of a routing portion of the internal shield, and the verification unit may comprise a computation unit for computing a target value to be sent through the routing portion and a comparison unit to check if a condition is satisfied between a value received from the routing portion and said target value.

The computation unit may be configured to implement a protection operation to compute said target value.

The integrated circuit device may comprise transistors and a set of auxiliary transistors, each auxiliary transistor being coupled to one or more transistor, the system further comprising a transistor control unit configured to actuate an auxiliary transistor in response to the detection of an attack.

At least some of the auxiliary transistors may be used to route portions of the internal shield.

There is also provided a method for protecting an integrated circuit device from attacks, the IC device comprising a substrate having a front surface and a back surface, the IC device further comprising a front side part arranged on the front surface of the substrate and comprising stacked layers, at least one of said layers comprising a data layer comprising wire carrying data, the front side part having a front surface, an internal shield being arranged in a layer located below said data layer, wherein the method comprises computing a target value to be sent through a routing portion of the internal shield and checking if a condition is satisfied between a value received from said routing portion and said target value.

Accordingly, during a backside attack, an attacker will be likely to damage either the added or the functional circuitries, or both, making the probability of a successful attack much smaller.

The protection system is adapted to allow the insertion of the backside shield in the lowest layers of the IC which is usually heavily used for transistor construction and transistor to transistor interconnection.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

It is noted that the drawings of the invention are not necessarily to scale. The drawings are merely schematic representations. The drawings are intended to depict only typical embodiments of the invention, and therefore should not be considered as limiting the scope of the invention

DETAILED DESCRIPTION

Embodiments of the invention provide a system and a method for protecting an Integrated Circuit (IC) device from backside attacks.

Figure 1:
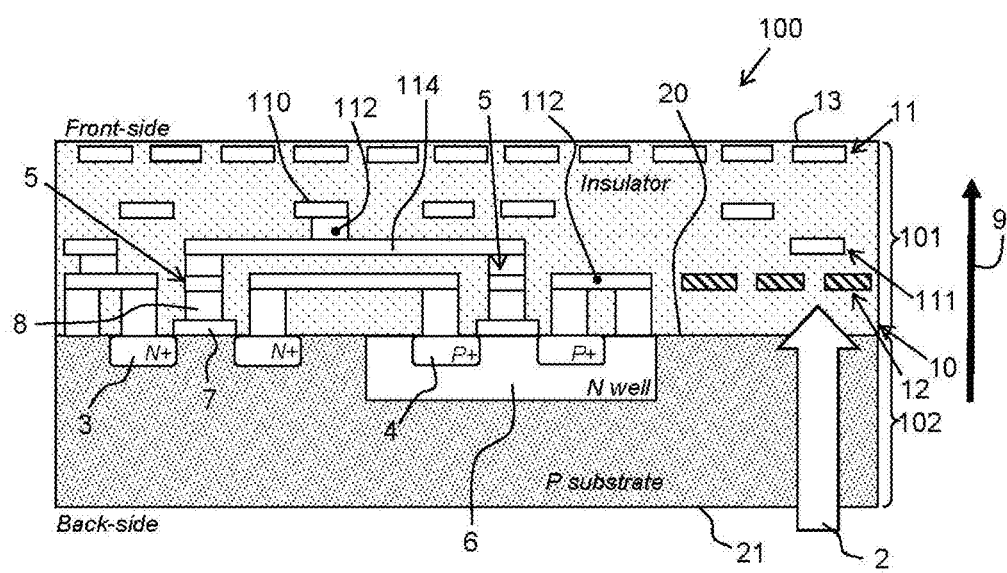
FIG. 1 represents a cross-sectional view of an IC device in which the protection system and method of the invention may be implemented, according to certain embodiments.

FIG. 1 represents a cross-sectional view of an IC device 100 in which the protection system and method of the invention may be implemented to protecting the Integrated Circuit (IC) device from a backside attack.

The IC device 100 may be any IC device incorporating secret data, such as a smartcard.

The IC device 100 comprises a front-side part 101 and a substrate 102.

As used herein, the "front-side" of an IC device is defined as the side of the IC device on which circuitry is provided.

The substrate 102 may consist of a semiconductor material, such as, for example, a substrate of monocrystalline silicon of undoped or doped P-type.

The substrate 102 includes a front surface 20 on which is arranged the front side part 101 comprising a stack of layers, and a back surface 21. The substrate 102 may further comprise doping areas 3, 4 which implement the source/drain of transistors 5 and polysilicon for implementing the gate of the transistors. Both doped (or "active") areas and polysilicon are conductive. More specifically, the IC circuit 10 may include N-type doped regions 3 and P-type doped regions 4 extending into the substrate 102 from the front surface 2. The areas 3 and 4 may be laterally separated from each other by an insulating region also formed in the substrate 102, for example by a deep trench isolation process. The IC device 100 may further comprise one or more wells, such as the N-well 6. Electrical components may be provided at the chambers formed by the doped areas 3 and 4, such as transistors 5 (e.g. P-channel transistor, N channel transistor, etc.). Each transistor 5 may comprise an insulating portion 7 covering the substrate 102 and forming the gate insulator of the transistor (for example in a polysilicon layer), a portion 8 of a semiconductor material covering the insulating portion 6 and forming the gate of transistor, spacers (not shown) surrounding the gate 8 and the doped regions (3, 4) disposed on either side of the gate 8 (source and drain regions of the transistor).

The front-side part 101 of the IC device comprises a stack of layers arranged on the substrate 102 including insulating layers 110, the transistors 5 created using the substrate 12 during the manufacturing process and wires carrying sensitive data 111. The interconnections between the layers (layer-to-layer interconnections) may be performed using "vias" 112. The layer-to-layer interconnections may be formed in the upper layers by metal interconnects 114 interconnecting the transistors 5. The metal used for the layer-to-layer interconnects may be conductive, and may have a much smaller resistivity than active and polysilicon.

According to one aspect of the invention, there is provided a protection system 10 arranged in the lowest technological layers of the Integrated Circuit (IC) device to protect the IC device 100 from backside attacks, such as a focused ion beam (FIB) backside attack, which may be performed through the silicon substrate via a back surface 21 of the substrate 102. The protection system 10 comprises an internal shield 12 arranged in the front-side part 101 of the IC device in the vicinity of the front surface 20 of the substrate 102. In certain embodiments, a front-side shield 11 may be further arranged in the front surface 13 of the front-side part 101 to prevent from front-side attacks.

The internal shield 12 is arranged at the lowest technological layers of the backside part 102 of the IC device (lowest technological layers of the IC device). This allows protecting sensitive data carried by metal wires 111 against tampering and probing from the backside (as represented for example by backside attack 2). The internal shield 12 will be referred hereinafter as a "backside shield".

The lowest technological layers in which the backside shield 10 is inserted may include the low conductive layers such as the active zones (doped silicon), the polysilicon layers, the metal layers or a combination of these layers with layer to layer connections (vias).

The backside shield 12 forms a physical structure including "mesh" lines inside the lowest level layers of the IC device 100 (metal, polysilicon or active area such as doped silicon) which are close to the front surface 20 of the substrate 102. The routing of the backside shield 10 is configured to fit the empty areas of the lowest layers of the IC device (not filled with other circuit elements), while bypassing the components arranged in these layers, such as transistors 5. The backside shield 12 forms a structure that may have a repeated routing pattern, rectilinear or not. For example, a repeated routing pattern may consist in rectilinear lines routed in the same direction, each line being parallel to the others.

The backside shield 12 according to the embodiments of the invention prevents invasive intrusions from entering from the circuit's backside surface 21 (backside attacks) which conventionally caused potential damages, for example on the system's security.

It should be noted that although the lowest layers of the IC device 10 are usually heavily used for transistor to transistor construction and interconnection, the proposed meshing of the backside shield 12 is adapted to such small and scarce empty areas while guarantying a protection against backside attacks.

The backside shield 12 also allows to protect the interconnect 114 between the transistors 5 (e.g between the gates) which is particularly crucial as a backside attack may try to probe a metal wire from the backside surface when the active layers are empty or unused for transistor construction. This makes it possible to protect the metal lines which are sensitive resources that can be probed.

In one embodiment, as represented in FIG. 1, the backside shield 12 may be implemented in a low metal layer of the front-side part 101 (portion of the backside shield are represented in FIG. 1 with strip boxes), for example in empty areas between the wires carrying sensitive data and the transistors 5.

In still other embodiments, the backside shield 12 may be arranged above areas that are not occupied by standard cells such standard cells containing transistors in the front part side 101. This compensates for the absence of standard cells which conventionally create empty areas that are vulnerable to backside attacks, as no active structure have to be damaged.

Figure 2:
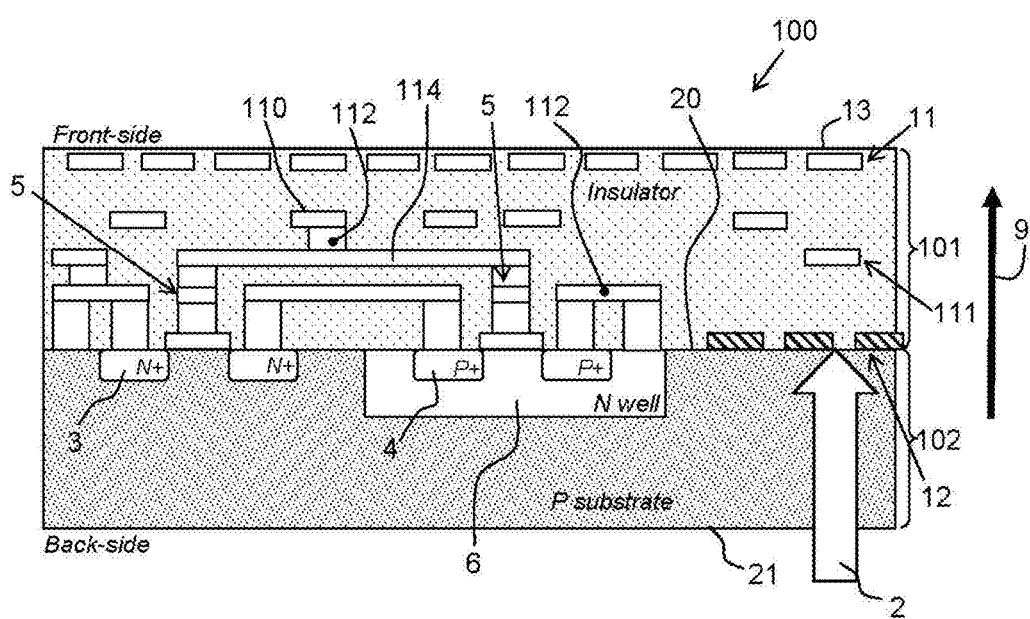
FIG. 2 represents a cross-sectional view of an IC device, showing an arrangement of the internal shield according to one embodiment.

As represented in FIG. 2, the backside shield 12 may be also implemented in the empty areas of the layer arranged on the front surface 13 of the substrate 102 in the form of a substrate-level shield, for example by using the polysilicon layer used to implement the transistor's gates. The configuration of the mesh lines of the backside shield 12 are such that the mesh lines in the empty areas cover the front surface 20 of the substrate 112 while shifting the routing vertically to bypass the components (e.g. transistors 5) arranged on the front surface 20. As used herein a "vertical" direction refers to the stacking direction of the layers of the IC device 100 as represented by the arrow 9 at the right of the IC device 100. Similarly, as used herein the expression "low", "top" "upper", "front", "back" are used with reference to the front surface of the IC device 13 (top direction) and to the back surface 20 of the substrate (down direction). Accordingly, lower layers are the layers of the IC device which are closer to the back surface 20 of the substrate while the upper or top layers are the layers of the IC device which are close to the front surface 13.

However, the invention is not limited to such arrangement of the backside shield 12 in the front part 101 of the IC device 100. Alternatively, the backside shield 12 may be implemented into the substrate 102.

Figure 3:
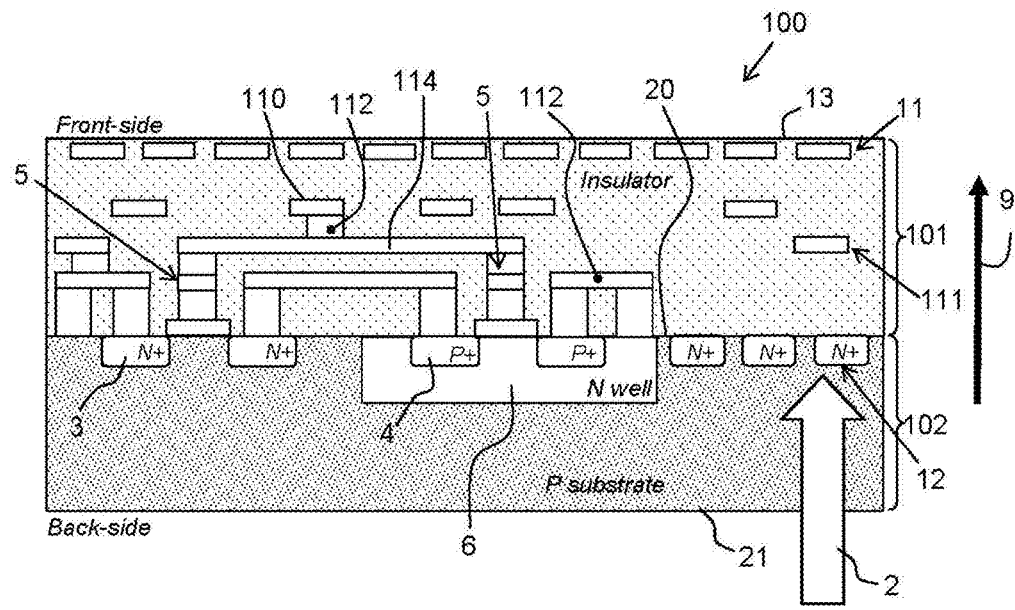
FIG. 3 represents a cross-sectional view of the IC device 100, showing an arrangement of the internal shield according to one embodiment.
Figure 4:
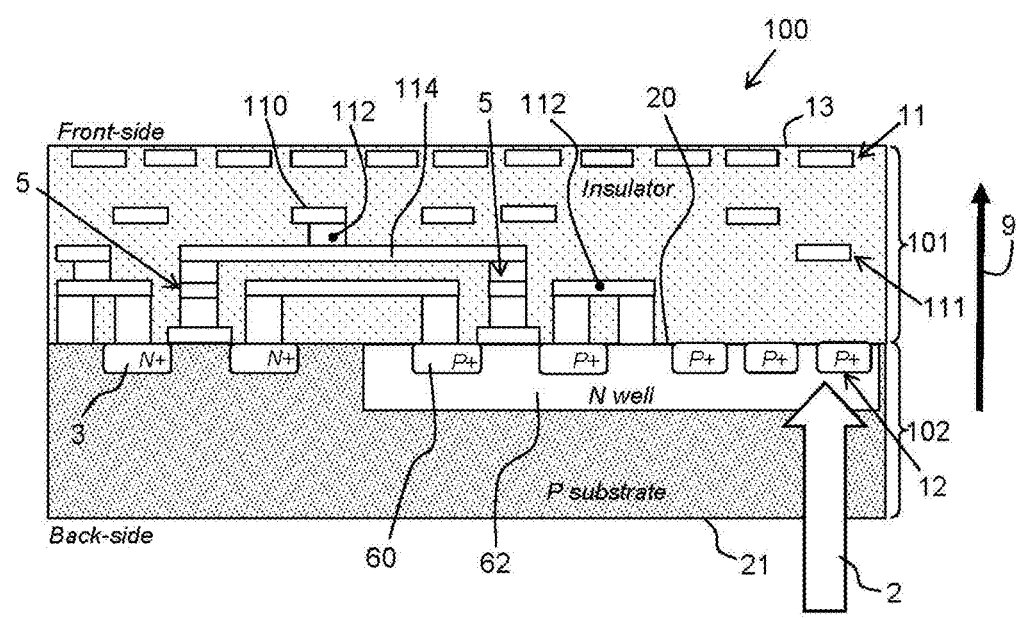
FIG. 4 represents a cross-sectional view of the IC device 100, showing an arrangement of the internal shield according to one embodiment.

FIGS. 3 and 4 represent a cross-sectional view of the IC device 100, according to such embodiments.

As shown in FIG. 3, the backside shield 12 may be implemented for example in one or more doped areas in the substrate 102, such as N-type doped areas 3. While FIG. 3 shows a backside shield implemented on N-type doped areas, the skilled person will readily understand that alternatively the backside shield may be implemented on P-type doped areas. In such embodiments, the mesh lines are routed using active layers. Routing of active layer mesh lines can be achieved in areas without active devices (transistors).

In yet another embodiment represented in FIG. 4, the backside shield 12 may be implemented in one or more wells in the substrate 102, such as in P-doped regions 60 included in a N-well 62 (or conversely in N-doped regions included in a P-well).

Advantageously, using active layers for mesh routing allows for the creation of a very low level mesh. Therefore, more backside attacks protected resources (metal layers, polysilicon) may be available above the shield to the designer for routing sensitive signals.

In the embodiments where the backside shield 12 is arranged in the lower layers of the front side part of the IC device 110, the backside shield may be arranged by redrawing standard cells so that a higher metal layer (for example only metal-2) and above are used in their routing, instead of using the lowest available routing layer (for example metal-1). In such exemplary implementation, the backside shield mesh can be routed below the standard cells metal interconnect by routing around vias when necessary.

Alternatively, a secure standard cells library may be designed specifically to embed the backside shield 12. This provides great shield coverage with very low implementation costs for the user/hardware designer. In this embodiment, the mesh is directly embedded in the standard cells layout. By using the protected standard cells in the design, the circuit may be intrinsically secured by the embedded backside shield mesh lines.

In an application of the invention to a 3D transistor stacking process such as a FD-SOI (Fully Depleted Silicon On Insulator) based process for example, it is possible to use routing resources available below active areas of transistors of upper stacking layers. In these processes, the density of interconnections (vias) from the upper stacking layers to the lower stacking layers allows the design of a densely routed backside shield below transistors active area for maximum security.

According to another feature, the protection system 10 may further comprise a verification circuit 15 connected to the backside shield 12 to control the integrity of the IC device (which encompasses the integrity of the interconnect structure's integrity or electrical connectivity) by measuring a circuit invariant. This allows detecting a backside attack conducted to damage the protection system 10 and/or the functional circuitries. Accordingly, the probability of a successful backside attack is highly reduced with respect to the prior art.

Even if the low conductive materials (e.g. polysilicon) of the lowest layers in which the verification circuit is implemented have a higher resistivity than metal, thereby making conducting signals through these materials slow and more power consuming, the verification circuit may have a frequency and a speed that are relatively slow to adapt to this constraint while efficiently ensuring the integrity check.

The verification circuit 15 is configured to generate an input test value to be propagated inside the backside shield routing and check the integrity of the test value at the output of the backside shield routing.

In particular, the verification circuit 15 may be configured to send signals over a route in the backside shield 12 from a start point of the IC device and check that the signals arrived in an unaltered form at the arrival point.

The verification circuit 15 may be arranged in the vicinity of sensitive components of the device or interleaved with sensitive components of the device.

Figure 5:
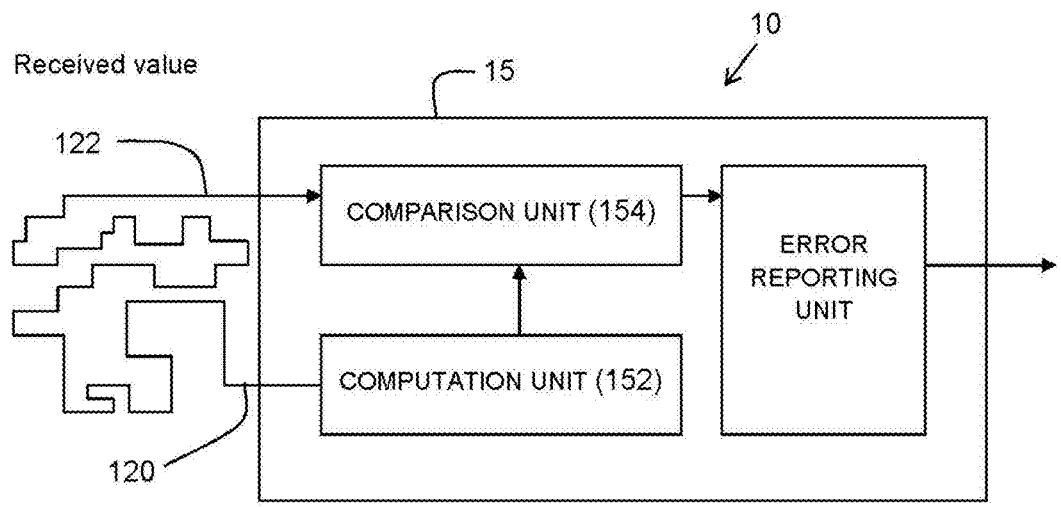
FIG. 5 is a block diagram of the verification circuit, according to certain embodiments.

FIG. 5 is a block diagram of the verification circuit 15. The verification circuit 15 is configured to control a routing 150 of the backside shield 12 between a start point 120 and an arrival point 122.

The verification circuit 15 comprises a computation unit 152 configured to compute the value to be transmitted over the routing 150 (also referred to hereinafter as the "expected value" or "target value"), and a comparison unit 154 configured to receive the data transmitted over the backside shield routing 150 and determine if the received value is equal to the expected value computed by the computation unit 152. The frequency of the verification may depend on a system clock. In addition, if the comparison implemented by the computation unit fails, an error reporting unit 153 may generate an error notification which may trigger an alarm. In FIG. 5, the received value may be the node corresponding to the backside shield equipotential.

In order to make reversing the structure more complex for an attacker, in certain embodiments, the verification circuit 15 may be implemented in the form of a dummy operations circuit. For example, the computation unit 152 of verification circuit 15 may implement arithmetic operations, ciphering operations, or Cyclic Redundancy Check (CRC) computations. The comparison unit 154 may then check against the expected values to ensure integrity of the verification circuit 15.

In still other embodiments, in order to thwart replay attacks, the input data used by the verification circuit 15 may be generated by a random number generator. Alternatively, the input data used by the verification circuit 15 may be derived from a random seed. The random seed may be used to initialize a pseudo random number generator such as a stream cipher or a block cipher, for example. In another embodiment, the input data used by the verification circuit may be generated using a method ensuring backward and forward secrecy. Backward and forward secrecy ensure that while some values are known, these values do not enable an attacker to guess previous or future values. The test vectors used by the verification circuit may be advantageously random or pseudo-random, unpredictable values.

Input data and target data may also be derived from a seed value, usually chosen randomly and renewed for every iteration of the verification, by using a function "f". Advantageously, the function f can be a one-way function. Examples of such one-way functions comprise cryptographic hash functions, stream cipher or block cipher. For example, the seed value may be used at the input key of a block cipher, the plaintext data of the block cipher being set to a known initial value or initialization vector, or alternatively being also randomly chosen.

In certain embodiments, the verification circuit 15 may be implemented by filling the low-density placement areas of the front-side part 101 with dummy computation circuitry configured to check the integrity of the IC device 10 by comparing the outputs of the dummy computation circuitry with predetermined expected outputs values. Predetermined output values may be stored in memory, or derived by an additional dummy computation logic performing functionally equivalent computations with possibly different implementations. One advantage of such embodiment is that this provides added security. In addition, the dummy computations circuitry may provide fault injection detection capabilities.

In certain embodiments, the dummy computation circuitry for the backside shield 12 may be a digital fault injection detection device.

Figure 6:
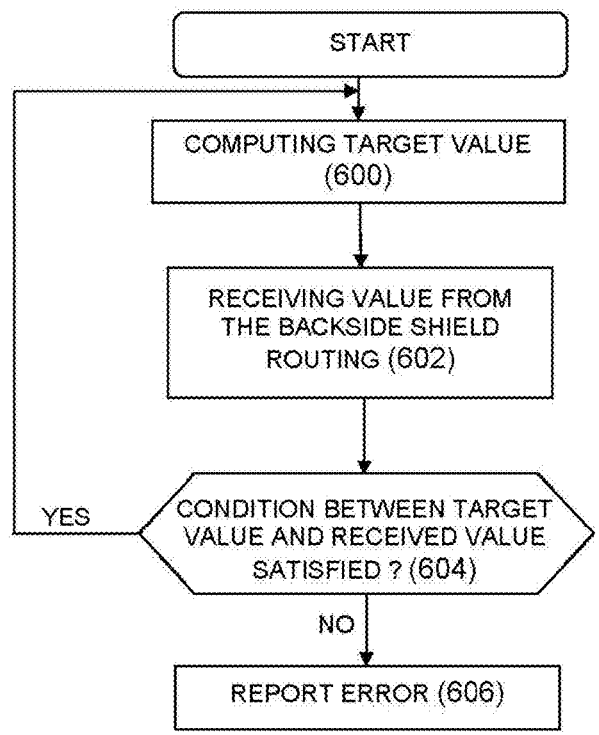
FIG. 6 is a flowchart depicting the operations of the verification circuit, according to certain embodiments.

FIG. 6 is a flowchart depicting the operations of the verification circuit 15 according to certain embodiments.

In step 600, the target value to be transmitted over the routing 150 is computed. The target value may be computed using protection operations such as arithmetic operations, ciphering operations, or Cyclic Redundancy Check, etc.

In step 602, the data transmitted over the backside shield routing 150 are received and check according to a predefined frequency and depending on a condition.

In step 604, it is determined if a condition between the value received in step 602 and the target value is satisfied (in particular an equality condition between the received value and the target value).

If the condition is not satisfied, an error is detected in step 606. The error may be reported by triggering an alarm. Otherwise, steps 602 to 606 are iterated.

Figure 7:
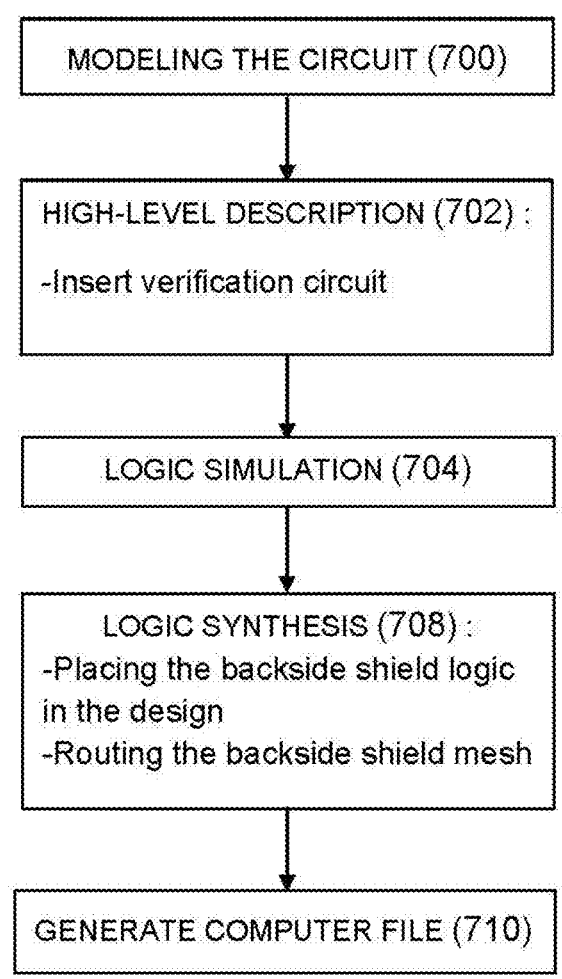
FIG. 7 is a flowchart depicting the IC device design flow according to certain embodiments.

FIG. 7 is a flowchart depicting the IC device design flow according to certain embodiments. The process of fabricating an Integrated circuit comprises a plurality of successive phases including the following preliminary phases:

- a phase of modeling the circuit (hardware and software) 700 in which the circuit is modeled at a very high level in order to validate in performance terms the chosen architecture relative to the application constraints;
- a high-level language description phase (block 702), after validation of the architecture in the modeling phase, in which the implementation of the circuit is described at the register transfer level (RTL) in the form of sequential elements (registers, latches) and combinational logic elements corresponding to the combinations between the inputs/outputs of the sequential elements and the principal inputs/outputs of the circuit; this description, referred to as the "behavioral description", is coded using a high-level programming language (e.g. RTL, etc.);
- a logic simulation phase to simulate the description using a simulator (block 704). The simulator simulates each interconnection signal in time as a function of an input stimulus described beforehand. The simulation may include simulation of the executable program associated with the processor of the circuit if it includes one;
- a functional verification phase to complement the simulation (block 706), notably to simulate longer operations, to accelerate the simulation and to obtain more complete results, using languages based on modeling by assertion to define the functional properties that the circuit must verify. The functional verification may either be implemented on the basis of random stimuli generators with automatic verification of the results relative to a reference model or use formal functional verification tools;

a logic synthesis phase (block 708) in which the behavioral description of the circuit is refined to yield a structural description at the level of the logic gates (the structural description is also referred to as a "netlist"), based on a library of logic gates (for example AND, OR gates, latches, etc.) specific to the target technology and/or to the foundry that will fabricate the circuit. The behavioral description is thus transformed into a technology-dependent netlist based upon standard cell library located in a library store. The netlist may include functional standard cell instances (e.g., flip-flops, NAND gates, inverters, etc.) and port connection information that describes electrical connections between the standard cell instances. The logic synthesis may take account of various operating constraints. The logic synthesis may be implemented by means of an EDA tool configured to transform the behavioral description in high-level language into the generic structural description (independent of the logic gate library) describing the combinational and sequential logic elements in generic form, then replacing them with elements from the logic gate library so as to meet conditions bearing on the characteristics of the circuit (e.g. logic paths of the circuits) relative to time constraints (for example, circuit operating frequency) and space constraints (size of silicon). If the elements selected do not meet the constraints, the synthesis tool can test other gates from the library.

The netlist may be used to place the standard cell instances on a design floorplan and perform a routing to place wire segment objects on the design floor plan based upon connection information that connect the standard cell instances (floorplan step 706). As used herein a design floorplan of an integrated circuit refers to a schematic representation of tentative placement of its major functional blocks (e.g., flip-flops, NAND gates, etc.). As discussed herein, wire segment objects are objects placed on a design floor plan, and wire segments are the metal placed on a semiconductor wafer corresponding to the wire segment objects. The design floorplan may include object placement information for multiple masks to generate multiple "layers" on the semiconductor wafer of the IC device. Semiconductor wafers may include several metal layers for routing wire segments, one of the metal layers including power rails running parallel to each other and providing power to standard cell circuitry.

Following the logic synthesis, a computer file (708) corresponding to the structural description may be obtained in step 710 in a chosen format such as Verilog, VHDL, EDIF. This file represents the instantiation of the gates from the library and their interconnection, representing the electronic circuit (netlist). Such a representation comprises only Boolean variables each represented by 1 bit. The circuit can then be fabricated in a factory.

The IC device 100 design flow may be adapted to implement the mesh related to the backside shield 12 and the verification circuit 15.

In one embodiment, the verification circuit logic may be inserted into the circuit netlist in step 1006. Then, prior to performing standard cells placement, in the floorplanning step (1008) of the logic synthesis phase, the backside shield logic may be placed in the design and the mesh of the backside shield 12 may be routed to cover routing areas. The standard cells are then placed in the available spaces and standard placement of cell and routing is performed.

Advantageously, insertion of the backside shield logic and mesh routing may be integrated in computer-assisted design tools to facilitate the deployment of the technology.

Figure 8:
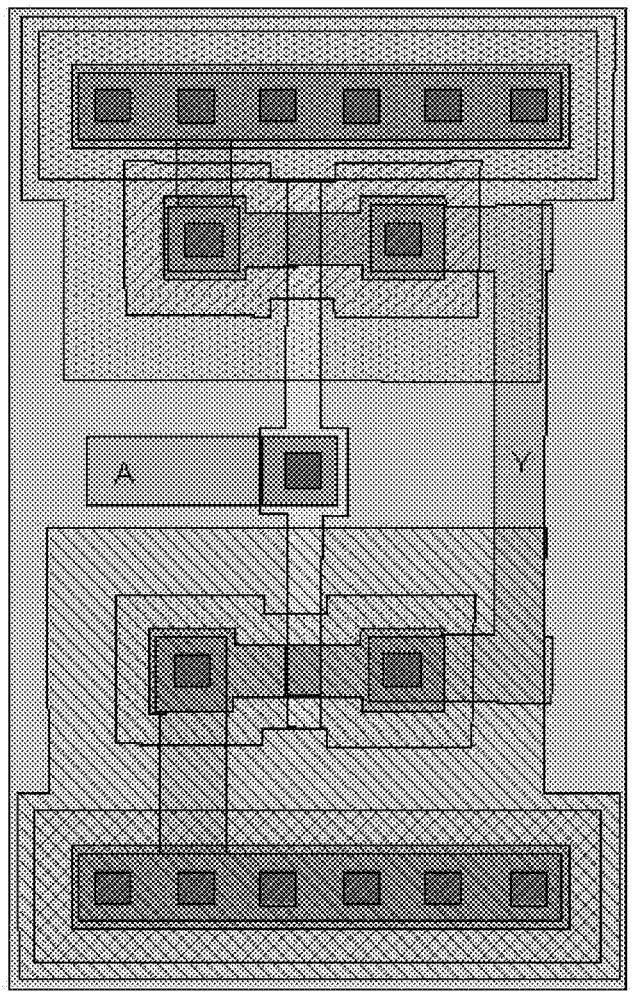
FIG. 8 represents an exemplary inverter standard cell with standard routing and without internal shield routing.
Figure 9:
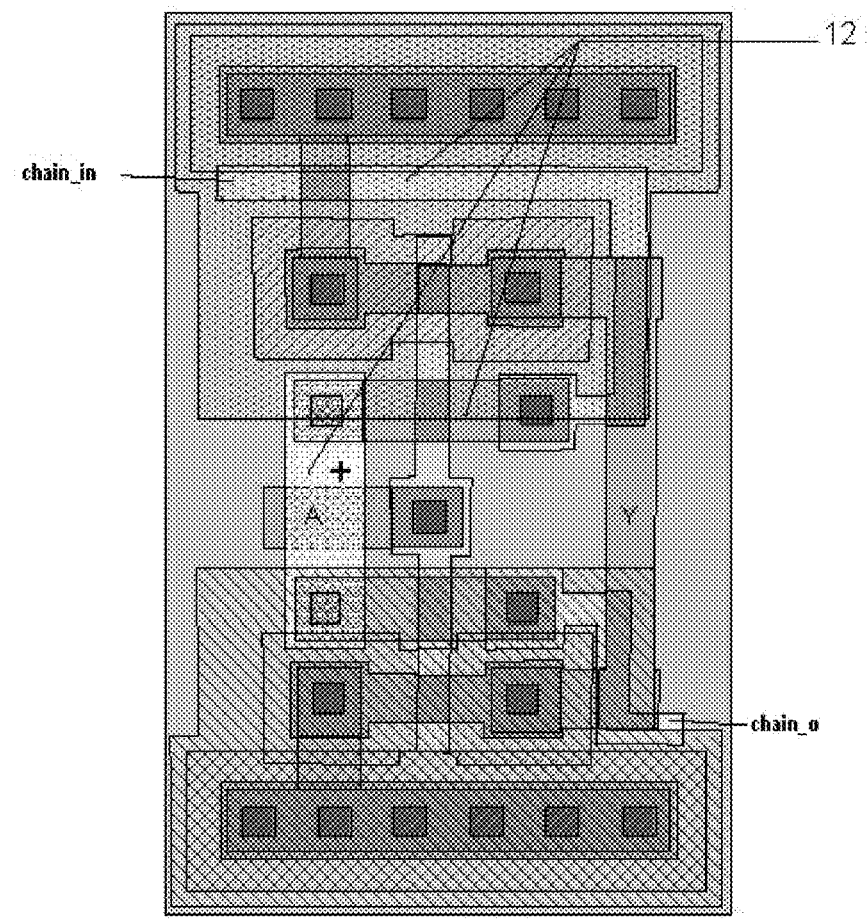
FIGS. 9, 10, 11 and 12 illustrate exemplary internal shield routing within an inverter standard cell, according to exemplary embodiments.
Figure 10:
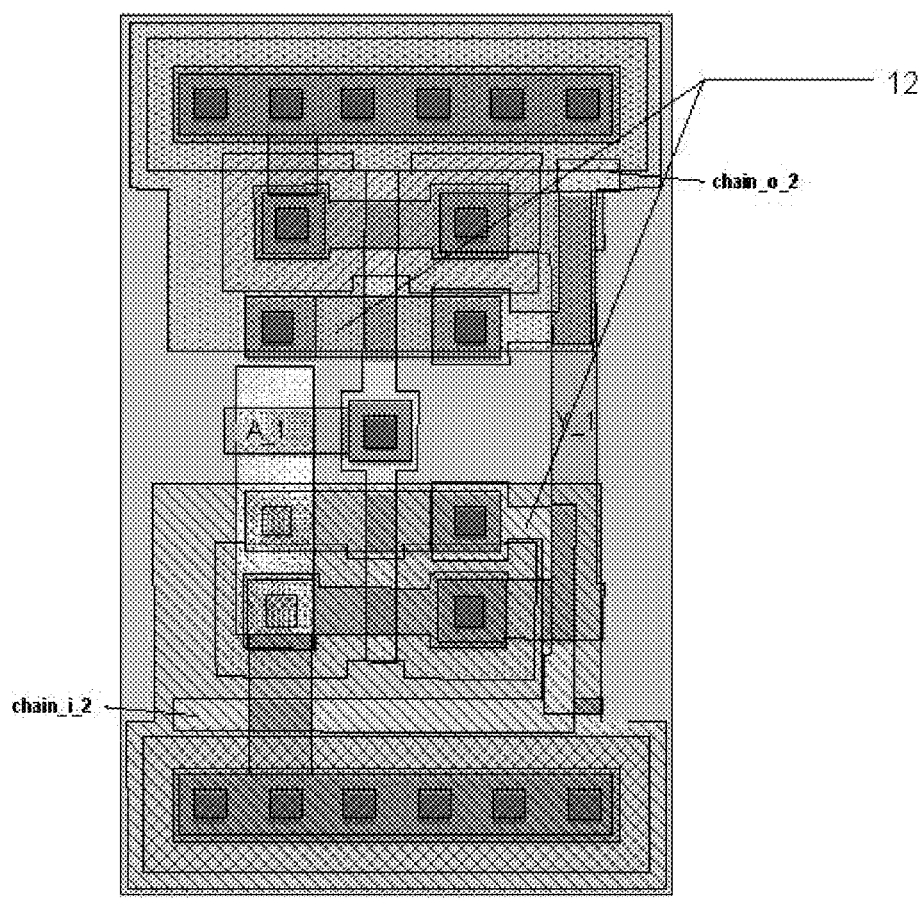
Figure 11:
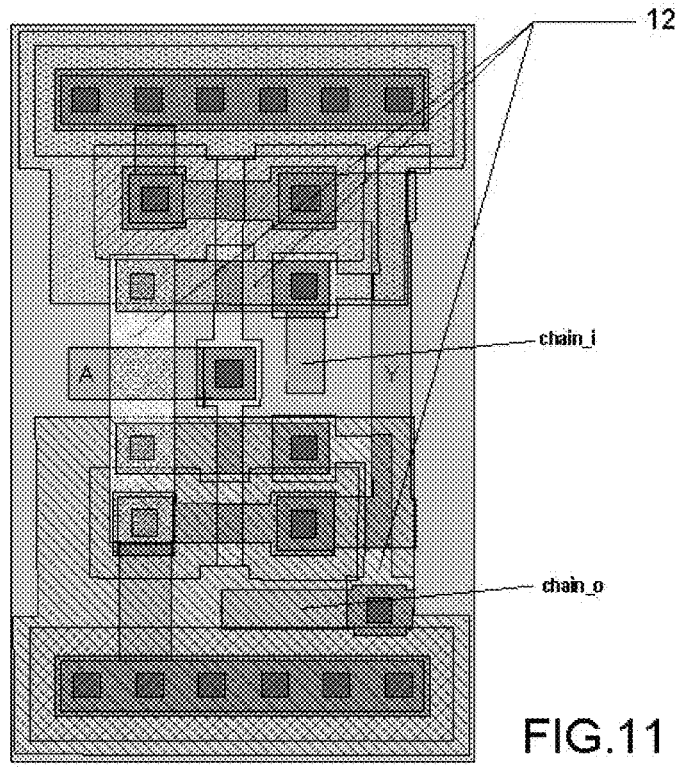
Figure 12:
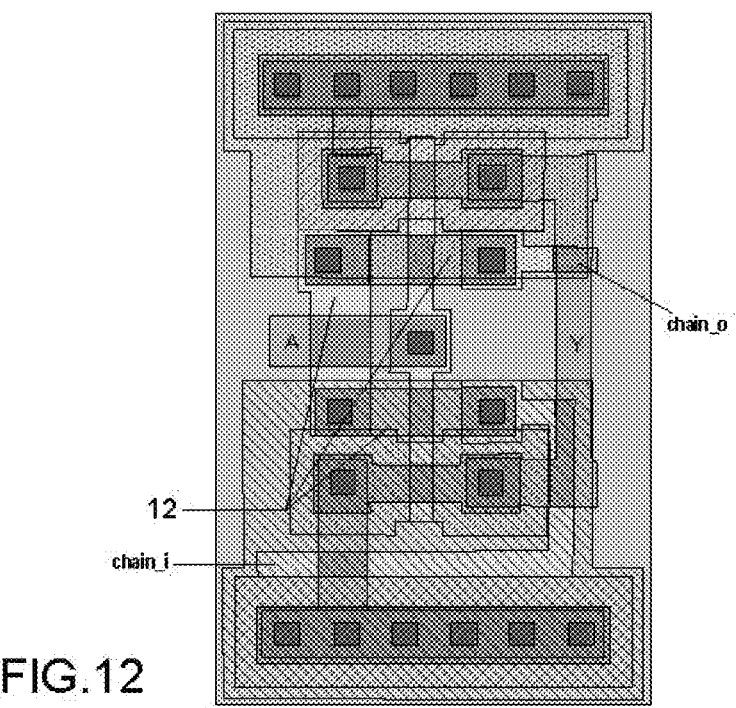
Figure 13:
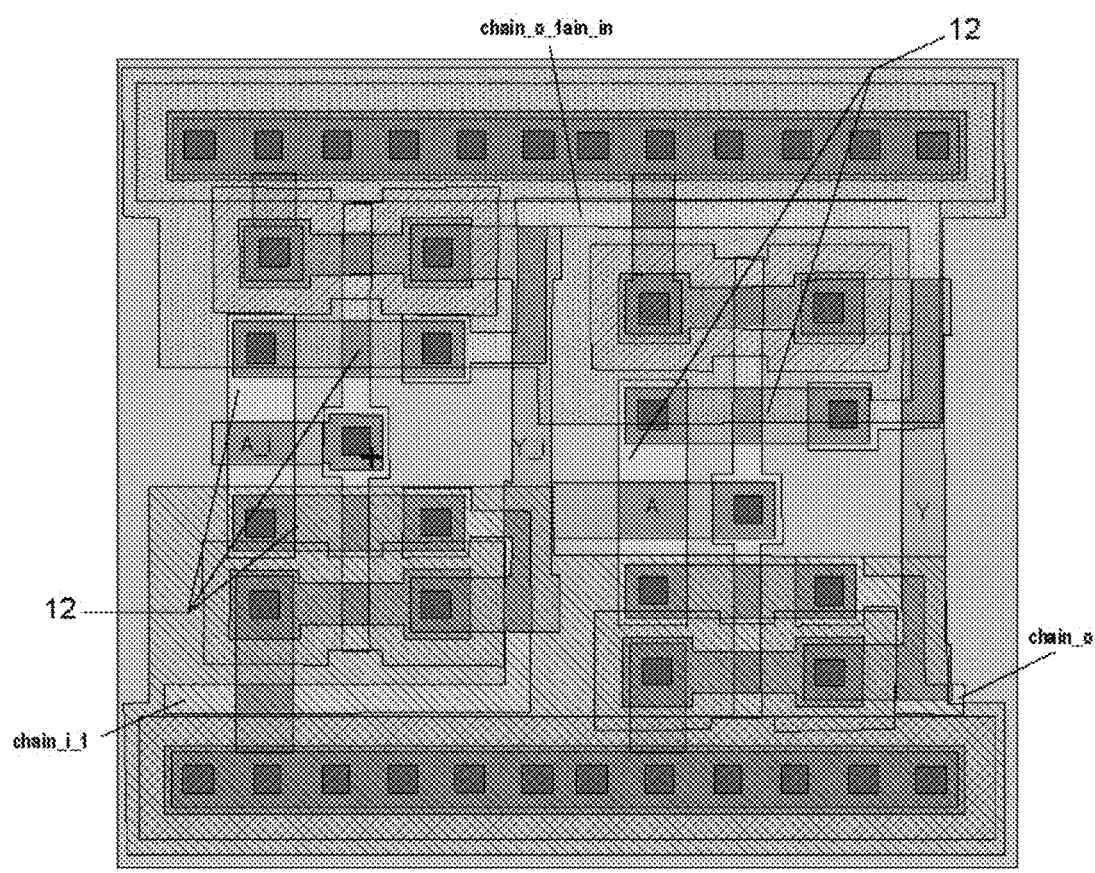
FIG. 13 illustrate an example of an internal shield mesh line connection by standard cell abutment.

It should be noted that the invention is not limited to particular routing form of the backside shield and may include any form of shield routing integrated between the front surface 13 of the front side part 101 of the IC device and the back surface 21 of the substrate 102, as illustrated by the exemplary embedded backside shield routing of FIGS. 8 to 12. In particular, FIG. 8 shows an inverter standard cell with standard routing. FIGS. 9, 10, 11 and 12 illustrate possible backside shield routing within the inverter standard cell. FIG. 13 illustrates another example of backside shield mesh line connection by standard cell abutment.

In certain embodiments, in order to further raise the cost of the possible attack on transistors such as an attack consisting in removing or probing transistors, a transistor backside attack mitigation method may be used in addition.

Figure 14:
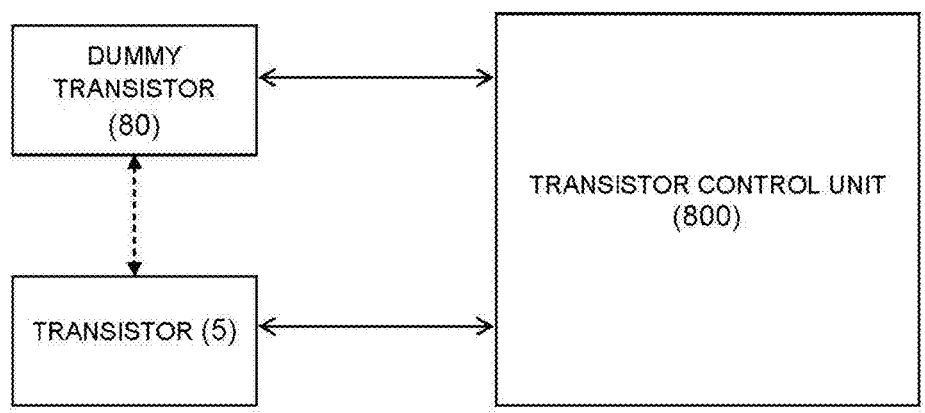
FIG. 14 represents an IC device comprising a protection system implementing the backside attack mitigation method according to certain embodiments.

FIG. 14 represents an IC device comprising a protection system 10 implementing the backside attack mitigation method according to certain embodiments. As shown, the IC device 100 comprises a set of auxiliary transistors 80 (also referred to hereinafter as "dummy transistors") inserted in the circuit. The dummy transistors 80 may be placed close to or in the vicinity of security-critical transistors 5 in order to further optimize the mitigation.

Figure 15:
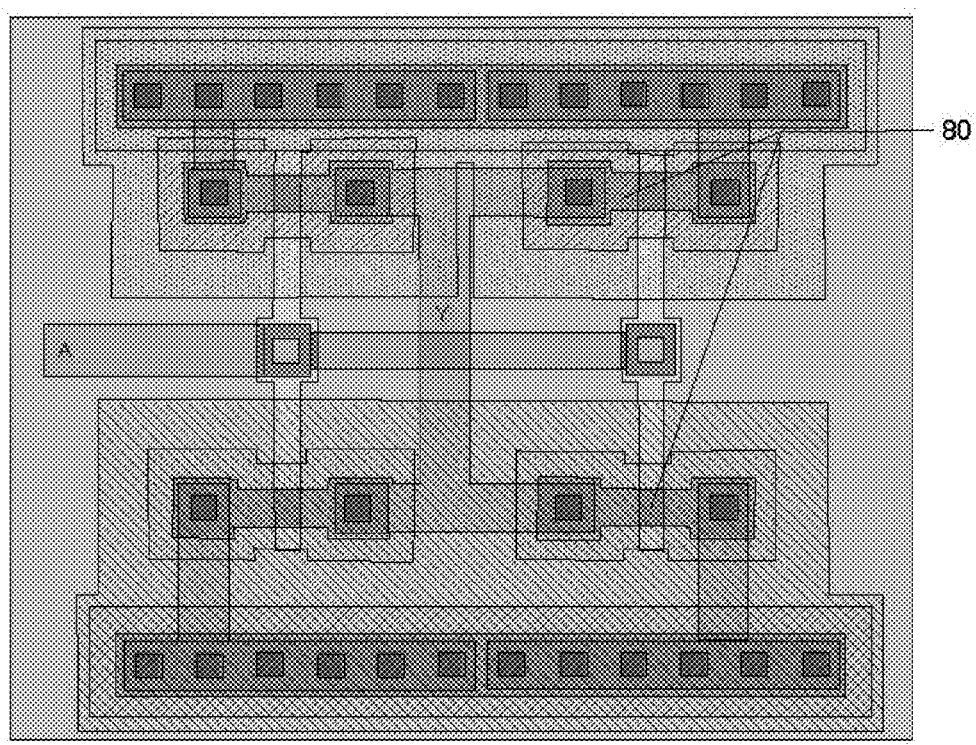
FIG. 15 represents an exemplary embodiment of the invention using functionally redundant auxiliary transistors.

The dummy transistors 80 may be used to perform redundant functions so that if a critical transistor 5 is removed, the dummy transistor 80 (corresponding to the redundant transistor) still performs the desired operations as a backup transistor. This renders the circuit more resilient to transistor removal. As an attacker will need to reverse the chip structure or proceed with trial, an error will be detected before attack success which subsequently raises the cost of the attack. FIG. 15 represents an exemplary embodiment of the invention using redundant dummy transistors.

The dummy transistors may be implemented in the doped areas of the substrate 102. The dummy transistors may be also implemented using the same layers as the functional transistors 5.

In addition a transistor control 800 unit may be implemented to control the dummy transistors to trigger the redundant mode if removal of a critical transistor associated with the redundant transistor is detected. Alternatively, the transistor control unit may be implemented to verify that the dummy transistors are present and check whether they are working properly. If the verification fails, the dummy transistors or the interconnect may have been damaged and the transistor control unit may optionally raise an alarm. The transistor control unit may also trigger other actions such as destroying security critical keys or valuable information.

The dummy transistors 80 may be inserted directly in the standard cells layout.

Figure 16:
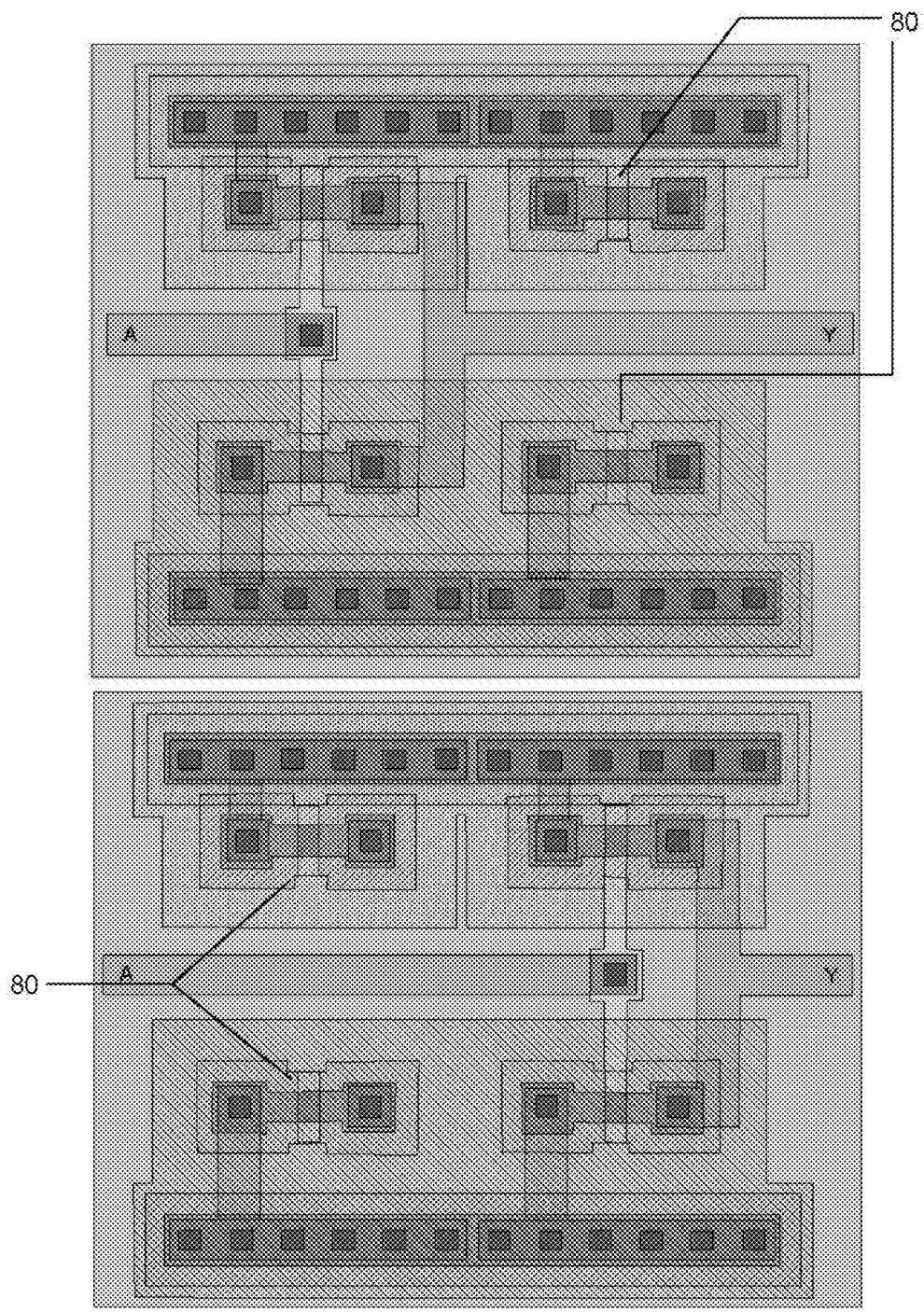
FIGS. 16 and 17 illustrate exemplary implementations of auxiliary transistors inside standard cells.
Figure 17:
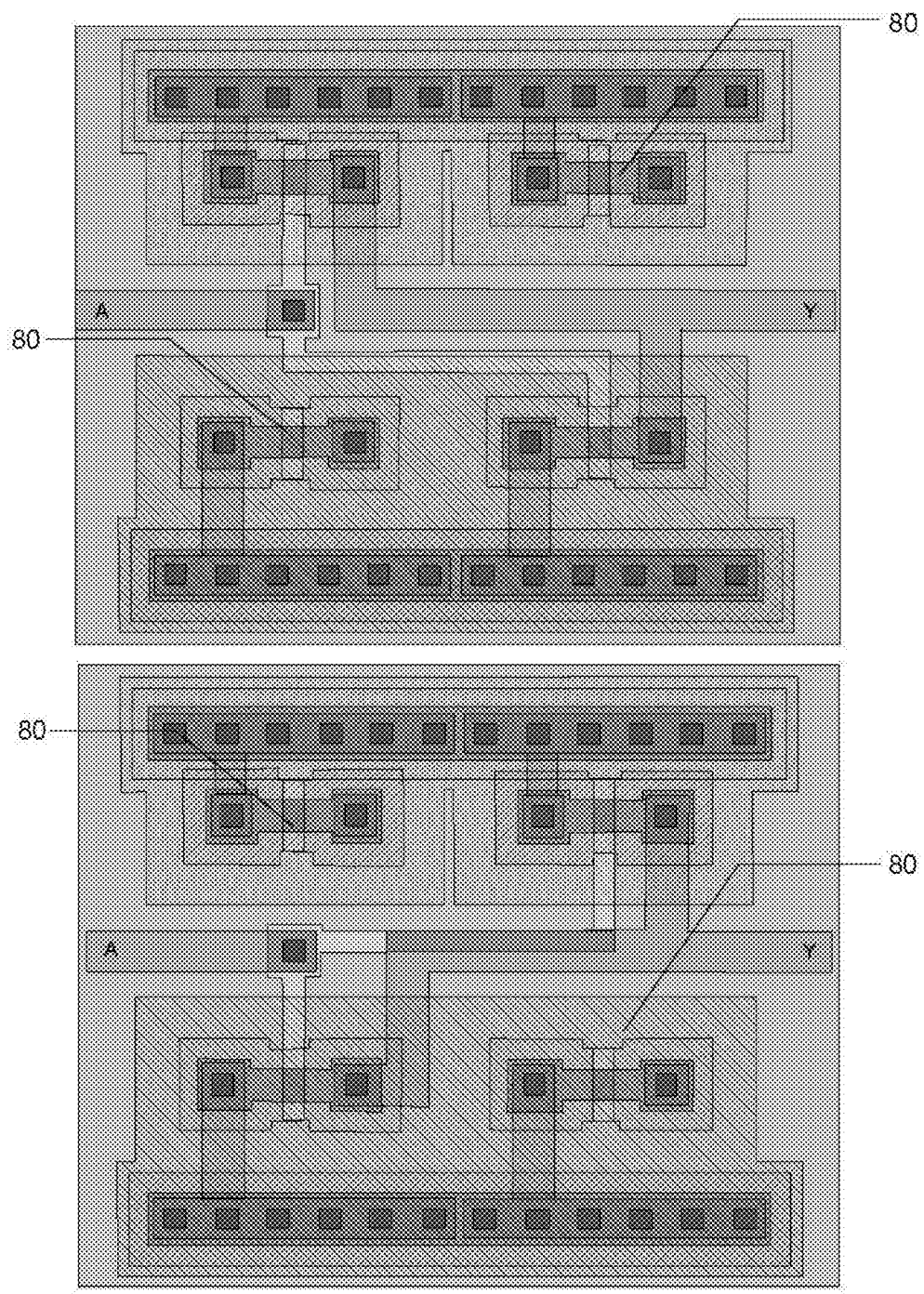

In particular, the internal signals of the standard cells in which the dummy transistors are inserted may use different sets of transistors while still retaining the same functionality. In such an embodiment, standard cells may provide more transistors than required to create the desired functionality. It is therefore possible to generate multiple functionally equivalent standard cells by selecting a subgroup of transistors among the available transistors and connecting them properly. Using functionally equivalent standard cells implemented using different sets of transistors allows rendering an attack more difficult. Examples of such functionally equivalent standard cells are represented in FIGS. 16 and 17.

Figure 18:
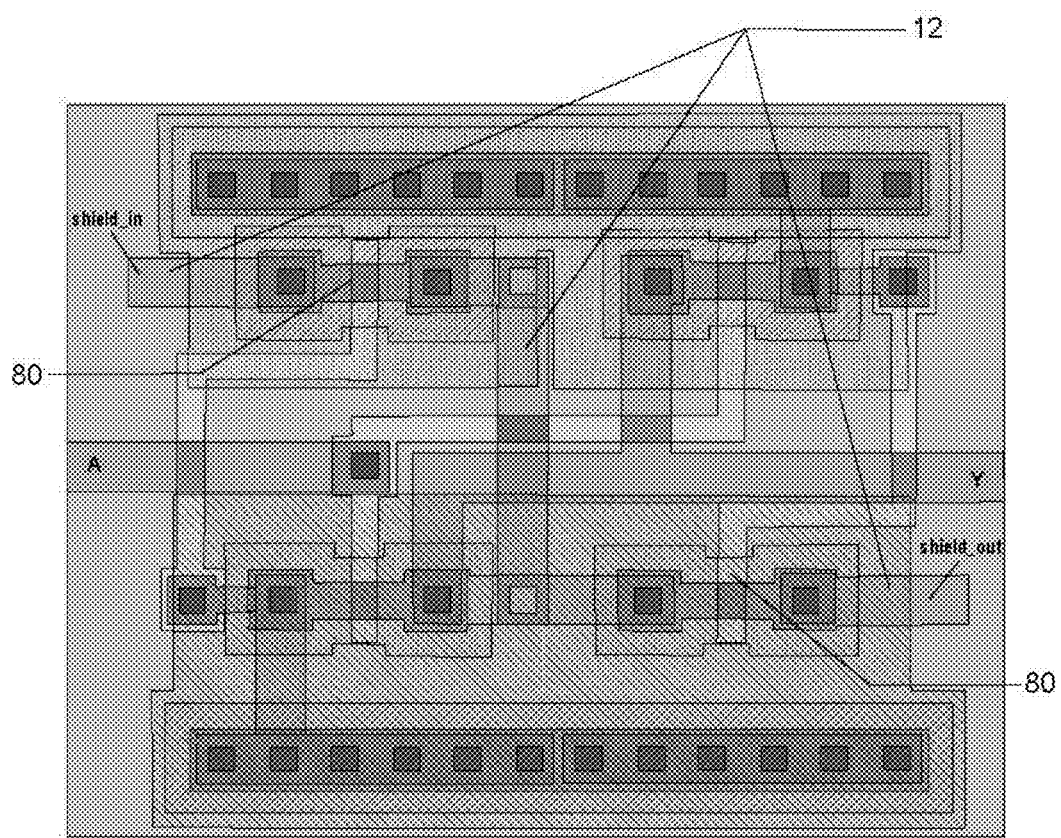
FIG. 18 represents an exemplary implementation of the auxiliary transistors in which the auxiliary transistors are used to route a shield mesh line of the internal shield.

In some embodiments, at least some of the dummy transistors 80 may be used to route portions of the backside shield 12. FIG. 18 represents an example of such implementation. In the implementation of FIG. 18, the dummy transistors 80 are used to route a shield mesh line of the backside shield, thereby making the attack much more complex. It should be noted that the backside shield mesh line uses a combination of multiple layers and layer to layer vias, including in this example metal-1, polysilicon and active layers.

Advantageously, the input and output pins of the standard cells may retain the same geometry across different implementations. This allows the standard cells to be easily swapped in the chip layout.

Figure 19:
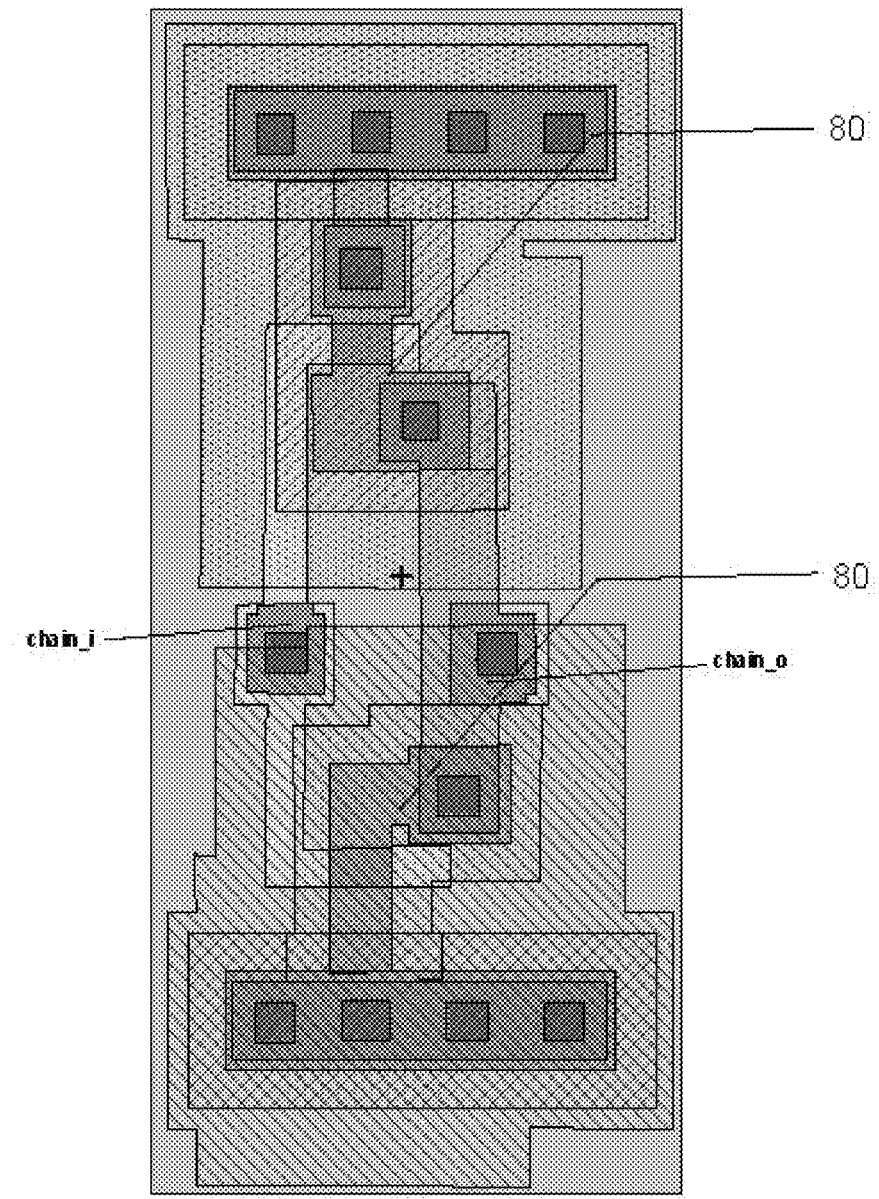
FIG. 19 represents an embodiment using auxiliary transistors implemented as a thin circuit component.

FIG. 19 represents another embodiment using dummy transistors implemented as a thin circuit component such as an inverter gate for example. Its output capacity may be weak while being strong enough to amplify a scan chain or a backside shield mesh line.

Embodiments of the present invention can take the form of an embodiment containing both hardware and software elements.

Furthermore, the protection methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

The invention claimed is:

1. A method for protecting an integrated circuit (IC) device from attacks, the IC device comprising a substrate having a front surface and a back surface, the IC device further comprising a front side part arranged above the front surface of the substrate and comprising stacked layers, at least one of said layers comprising a data layer comprising wire carrying data, the front side part having a front surface, an internal shield being arranged in the IC device, below said data layer, wherein the method comprises computing a target value to be sent through a routing portion of the internal shield and checking if a condition is satisfied between a value received from said routing portion and said target value.

2. A system for protecting an integrated circuit (IC) device from attacks, the IC device comprising a substrate having a front surface and a back the IC device further comprising a front side part arranged above the front surface of the substrate and comprising stacked layers, at least one of said layers comprising a data layer comprising wire carrying data, the front side part having a front surface, wherein the system comprises an internal shield arranged in the IC device, below said data layer, said internal shield comprising a mesh of lines arranged according to a routing pattern, said internal shield being configured to propagate data, and a verification circuit configured to check integrity of a routing portion of the internal shield, said verification circuit being configured to propagate an input value inside said routing portion of internal shield and check the integrity of said input value at the output of said routing portion of the internal shield.

3. The system of claim 2, wherein the internal shield comprises a mesh of lines, said mesh, being arranged in the empty areas of the layer in which the internal shield is arranged.

4. The system of claim 2, wherein the substrate comprises doped areas and the internal shield is implemented in at least some of the doped areas.

5. The system of claim 2, wherein the front-side part comprises standard cells, and the internal shield is implemented in areas between standard cells.

6. The system of claim 2, wherein the substrate comprises wells in doped regions and the internal shield is implemented in at least some of said wells.

7. The system of claim 2, wherein the internal shield is arranged in the layer located on top of the substrate.

8. The system of claim 2, wherein the internal shield is implemented in standard cells.

9. The system of claim 2, wherein said integrated circuit device comprises security-critical transistors and a set of auxiliary transistors, each auxiliary transistor being coupled to one or more security-critical transistor, each auxiliary transistor being a backup transistor configured to perform the operations of a security-critical transistor coupled to said auxiliary transistor when said security-critical transistor is removed in an attack.

10. The system of claim 9, wherein at least some of the auxiliary transistors are used to route portions of the internal shield.

11. The system of claim 2, wherein the verification circuit comprises a computation unit for computing a target value to be sent through the routing portion of the internal shield and a comparison unit to check if a condition is satisfied between a value received at the output of said routing portion and said target value.

12. The system of claim 11, wherein said computation unit is configured to implement a protection operation to compute said target value.

* * * * *